United States Patent
Zhu

(10) Patent No.: US 11,608,056 B2
(45) Date of Patent: Mar. 21, 2023

(54) POST COLLISION DAMAGE REDUCTION BRAKE SYSTEM INCORPORATING FRONT OBSTACLE AVOIDANCE

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 96 days.

(21) Appl. No.: 16/723,796

(22) Filed: Dec. 20, 2019

(65) Prior Publication Data

US 2021/0188257 A1 Jun. 24, 2021

(51) Int. Cl.
| | | |
|---|---|---|
| B60W 30/09 | (2012.01) | |
| B60W 60/00 | (2020.01) | |
| B60T 7/22 | (2006.01) | |
| B60T 8/171 | (2006.01) | |
| B60T 8/172 | (2006.01) | |
| B60W 10/10 | (2012.01) | |
| B60W 10/18 | (2012.01) | |

(Continued)

(52) U.S. Cl.
CPC .............. B60W 30/09 (2013.01); B60T 7/22 (2013.01); B60T 8/171 (2013.01); B60T 8/172 (2013.01); B60T 8/174 (2013.01); B60W 10/10 (2013.01); B60W 10/18 (2013.01); B60W 60/0017 (2020.02); *B60T 2201/022* (2013.01); *B60T 2201/024* (2013.01); *B60T 2210/32* (2013.01); *B60W 2030/082* (2013.01); *B60W 2554/00* (2020.02); *B60W 2710/1005* (2013.01); *B60W 2710/18* (2013.01)

(58) Field of Classification Search
CPC .. B60W 30/09; B60W 60/0017; B60W 10/18; B60W 10/10; B60W 2554/00; B60W 2030/082; B60W 2710/1005; B60W 2710/18; B60W 2554/802; B60W 2554/804; B60W 2520/105; B60W 2520/10; B60W 2554/4041; B60W 2554/4042; B60W 10/184; B60W 10/20; B60W 2552/50; B60W 2554/40; B60W 2710/10; B60W 2710/20; B60T 8/171; B60T 8/174; B60T 8/172; B60T 7/22; B60T 2210/32; B60T 2201/022; B60T 2201/024

See application file for complete search history.

(56) References Cited

U.S. PATENT DOCUMENTS

| | | | |
|---|---|---|---|
| 9,771,055 | B1 | 9/2017 | Zhang et al. |
| 2009/0099734 | A1* | 4/2009 | Le .................. B60R 21/0132 |
| | | | 701/46 |

(Continued)

FOREIGN PATENT DOCUMENTS

| | | |
|---|---|---|
| DE | 102014013544 A1 | 4/2015 |
| FR | 3054497 A1 | 2/2018 |

*Primary Examiner* — James J Lee
*Assistant Examiner* — Alexander George Matta
(74) *Attorney, Agent, or Firm* — Womble Bond Dickinson (US) LLP

(57) ABSTRACT

A first obstacle colliding with the ADV is detected. A minimum deceleration that is required for the ADV to avoid colliding with a second obstacle within a predetermined proximity of a moving direction is determined. A brake command is generated based on the minimum deceleration. Then, the brake command is applied to the ADV, such that the ADV avoids collision with the second obstacle and softens an impact of the collision with the first obstacle.

18 Claims, 8 Drawing Sheets

(51) Int. Cl.
    *B60W 30/08*     (2012.01)
    *B60T 8/174*     (2006.01)

(56)     References Cited

U.S. PATENT DOCUMENTS

| | | | |
|---|---|---|---|
| 2009/0265107 A1 | 10/2009 | Matsuno | |
| 2013/0054103 A1* | 2/2013 | Herink | B60W 30/09 |
| | | | 701/65 |
| 2013/0110368 A1* | 5/2013 | Zagorski | B60T 7/22 |
| | | | 701/70 |
| 2014/0222280 A1* | 8/2014 | Salomonsson | B60Q 9/008 |
| | | | 701/28 |
| 2015/0348337 A1* | 12/2015 | Choi | G07C 5/008 |
| | | | 701/31.5 |
| 2016/0207530 A1* | 7/2016 | Stanek | B60W 30/09 |
| 2017/0001636 A1* | 1/2017 | Laur | B60W 10/18 |
| 2018/0141545 A1* | 5/2018 | Freytag | B60S 1/56 |
| 2020/0139963 A1* | 5/2020 | Kim | B60W 30/0953 |

\* cited by examiner

POST COLLISION DAMAGE REDUCTION BRAKE SYSTEM INCORPORATING FRONT OBSTACLE AVOIDANCE

TECHNICAL FIELD

Embodiments of the present disclosure relate generally to operating autonomous vehicles. More particularly, embodiments of the disclosure relate to a post collision damage reduction of an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. During a collision of an ADV and an obstacle, it is important to reduce damage to the ADV and the obstacle, and avoid to introduce damages to other obstacles. However, currently, the ADV is configured to keep a brake during the collision, which may not be always the best solution. For example, if the ADV is hit from behind, the ADV may not be able to absorb the energy from the collision if the ADV just keeps the brake.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
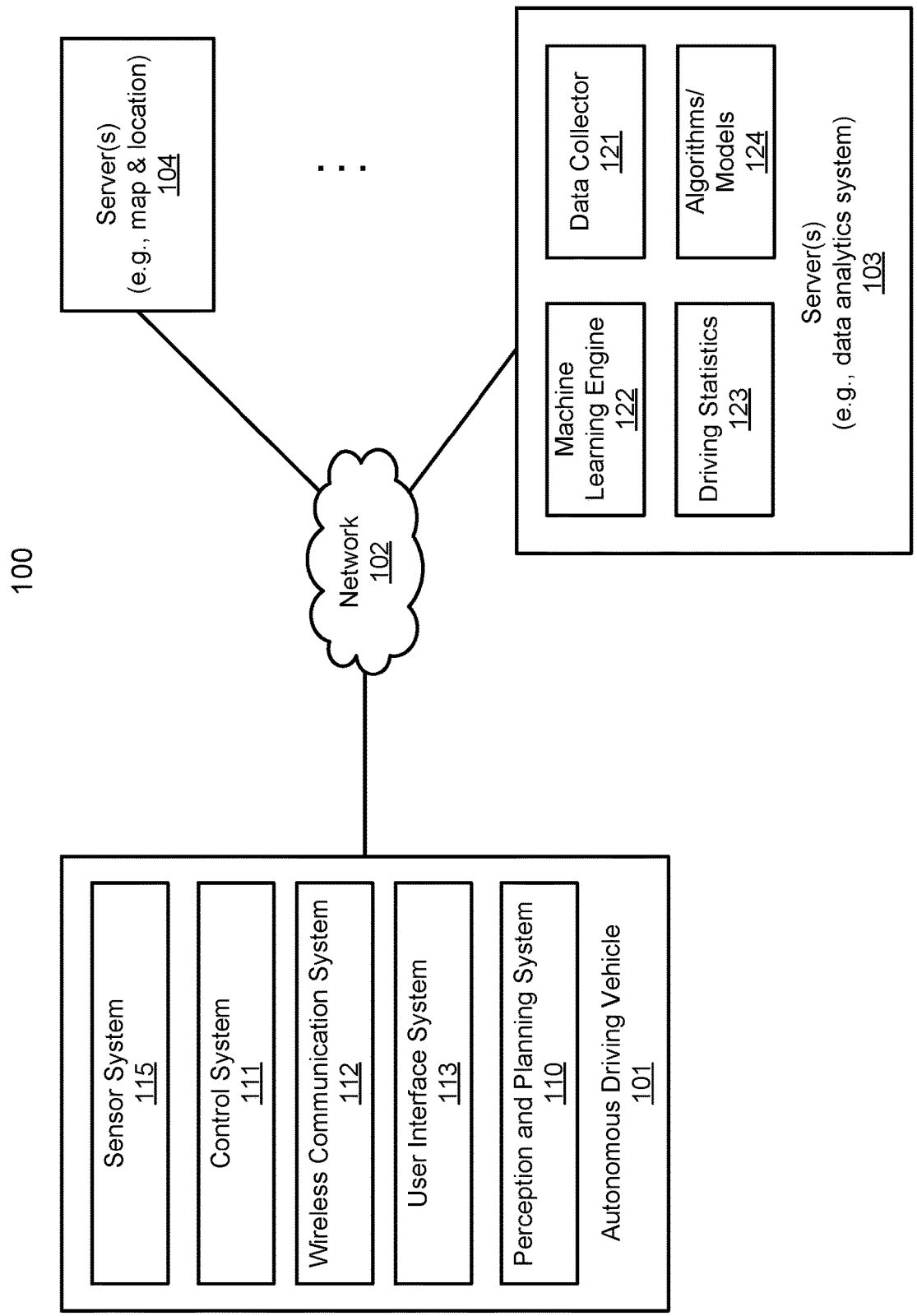
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a collision condition is determined by an ADV, for example, an inertial measurement unit (IMU) may monitor sudden changes in acceleration (>1G). A current moving direction of the ADV and a closest obstacle in this moving direction may be determined. A gear position of the ADV may be set to a "neutral" position. A time duration to a second collision to the closest obstacle may be determined. If the time duration to the second collision is more than a predetermined time threshold, for example, 8 seconds, a deceleration may not be needed. Thus, a minimum deceleration may be determined to be zero. Accordingly, a brake command of "zero" may be generated. The ADV may not need to brake. If the time duration to the second collision is less than or equal to the predetermined time threshold, a minimum deceleration required to avoid the second collision may be calculated. For example, the minimum deceleration may be calculated based on a difference between a speed of the ADV and a speed of the second obstacle, and a distance between the ADV and the second obstacle. Then, the deceleration command may be applied to the ADV.

According to one embodiment, a first obstacle colliding with the ADV is detected. A minimum deceleration that is required for the ADV to avoid colliding with a second obstacle within a predetermined proximity of a moving direction is determined. A brake command is generated based on the minimum deceleration. Then, the brake command is applied to the ADV, such that the ADV avoids collision with the second obstacle and softens an impact of the collision with the first obstacle.

In one embodiment, the first obstacle colliding with the ADV is detected based on detecting that an acceleration or deceleration of the ADV is larger than a predetermined acceleration or deceleration threshold. In one embodiment, a closest obstacle within the predetermined proximity of the moving direction is determined, where the second obstacle is the closest obstacle. In one embodiment, a gear position of the ADV is selected to be a "Neutral" position.

In one embodiment, whether a time duration when the ADV is to be in collision with the second obstacle is more than a predetermined time threshold is determined.

In one embodiment, in response to determining that the time duration when the ADV is to be in collision with the second obstacle is more than the predetermined time threshold, the minimum deceleration is determined to be zero, and the brake command is the brake command is a brake command of "zero". The ADV is allowed to slide to soften an impact of the collision with the first obstacle.

In one embodiment, in response to determining that the time duration when the ADV is to be in collision with the second obstacle is less than or equal to the predetermined time threshold, the minimum deceleration is calculated based on a difference between a speed of the ADV and a speed of the second obstacle, and a distance between the ADV and the second obstacle.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
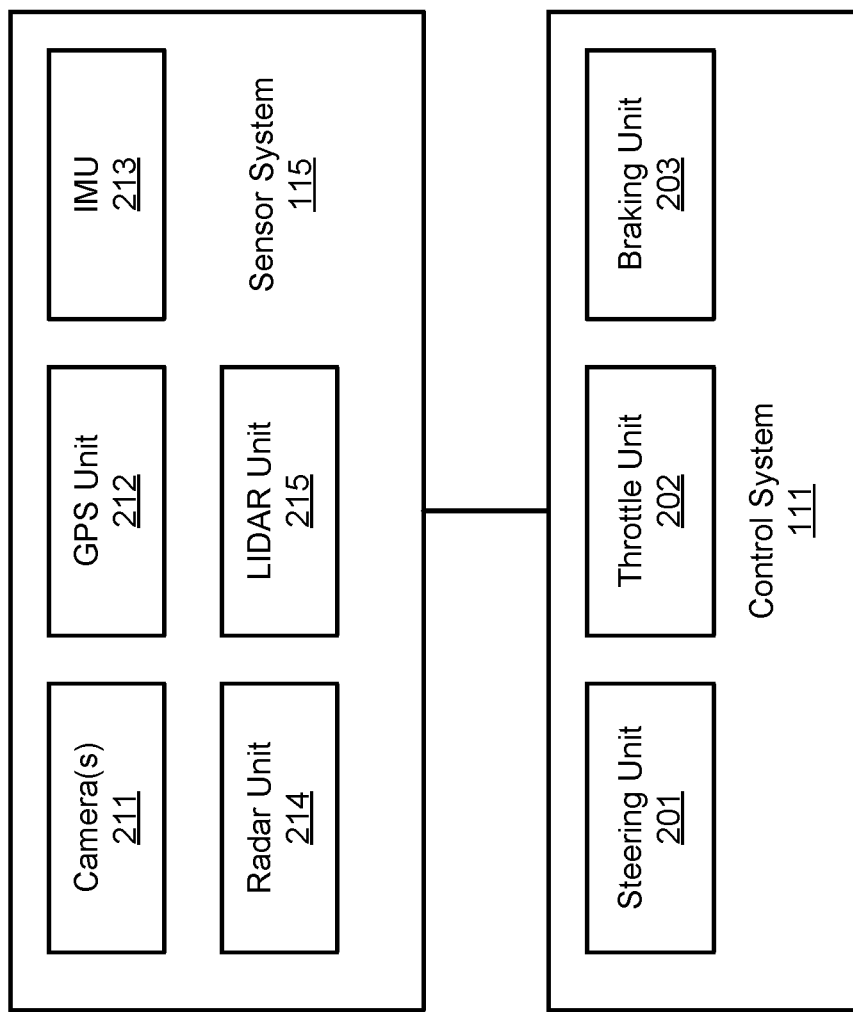
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to perceive a driving environment, including detecting a first obstacle colliding with the ADV, an algorithm or model to determine a moving direction, an algorithm or model to determine a minimum deceleration, an algorithm or model to generate a brake command, and/or an algorithm or model to applying the brake command to the ADV, which will be described in details further below. Algorithms 124 can then be uploaded on ADVs to be utilized during autonomous driving in real-time.

Figure 3A:
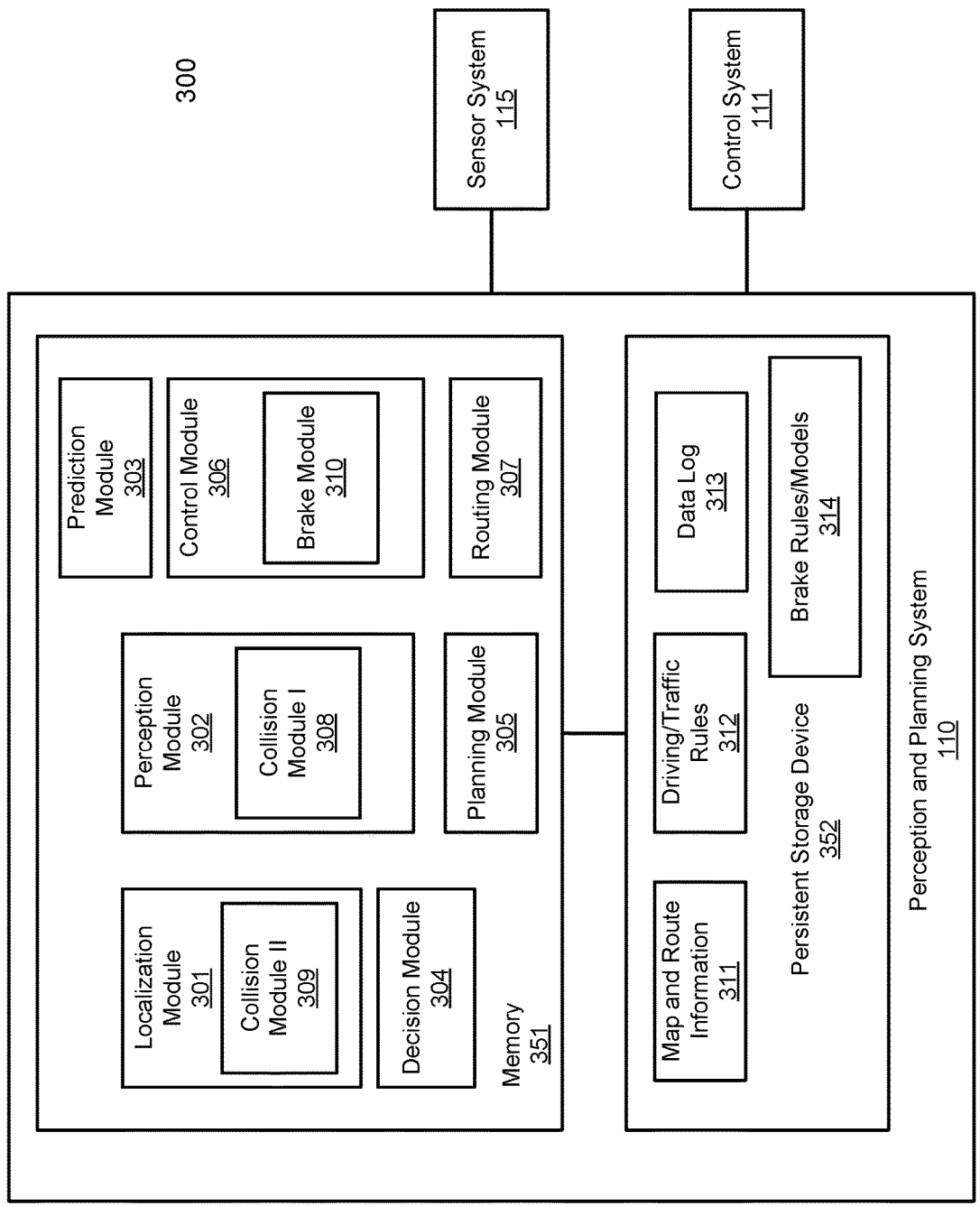
FIGS. 3A-3B are block diagrams illustrating an example of a perception and planning system used with an autonomous vehicle according to one embodiment.
Figure 3B:
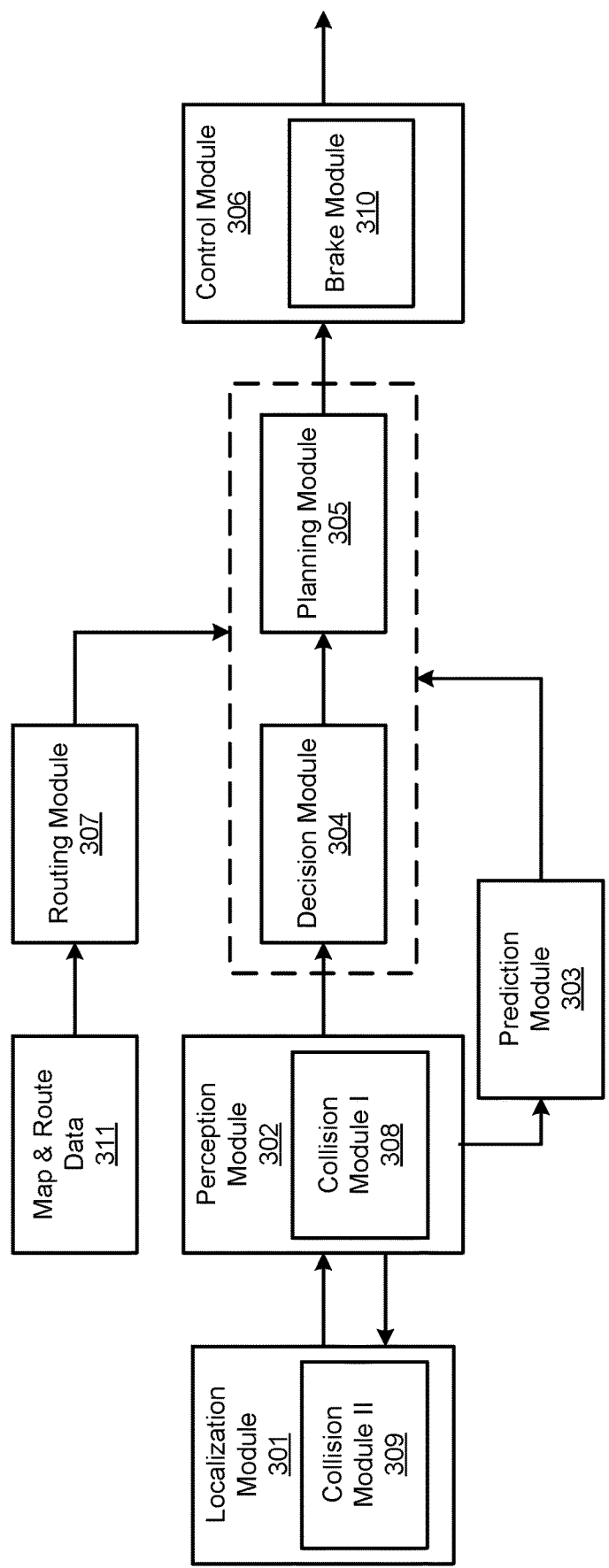

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, collision module I 308, collision module II 309, and Brake module 310.

Some or all of modules 301-310 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Although not shown, perception and planning system 110 further includes a data logger or data collector configured to collect data processed by the components 301-310 and sensors over a period of time, which may be stored as a part of data log 313. For example, data log 313 includes any prediction, decision, and paths planned or made in each of the driving/planning cycle. Data log 313 may further include control commands issued and the responses or states (e.g., speed, acceleration, heading, locations, etc.) of the vehicle captured at different points in time during each driving cycle. Data log 313 may further include the obstacles or moving objects perceived over a period of time and their behaviors (e.g., prior locations, speed, headings captured during past cycles, etc.). Data log 313 may be utilized for planning and controlling the vehicle subsequently or alternatively, data log 313 may be analyzed offline for improving the driving algorithms or predictive models. The perception and planning system 110 may further include a brake rules/models for a set of brake rules/models.

Figure 4:
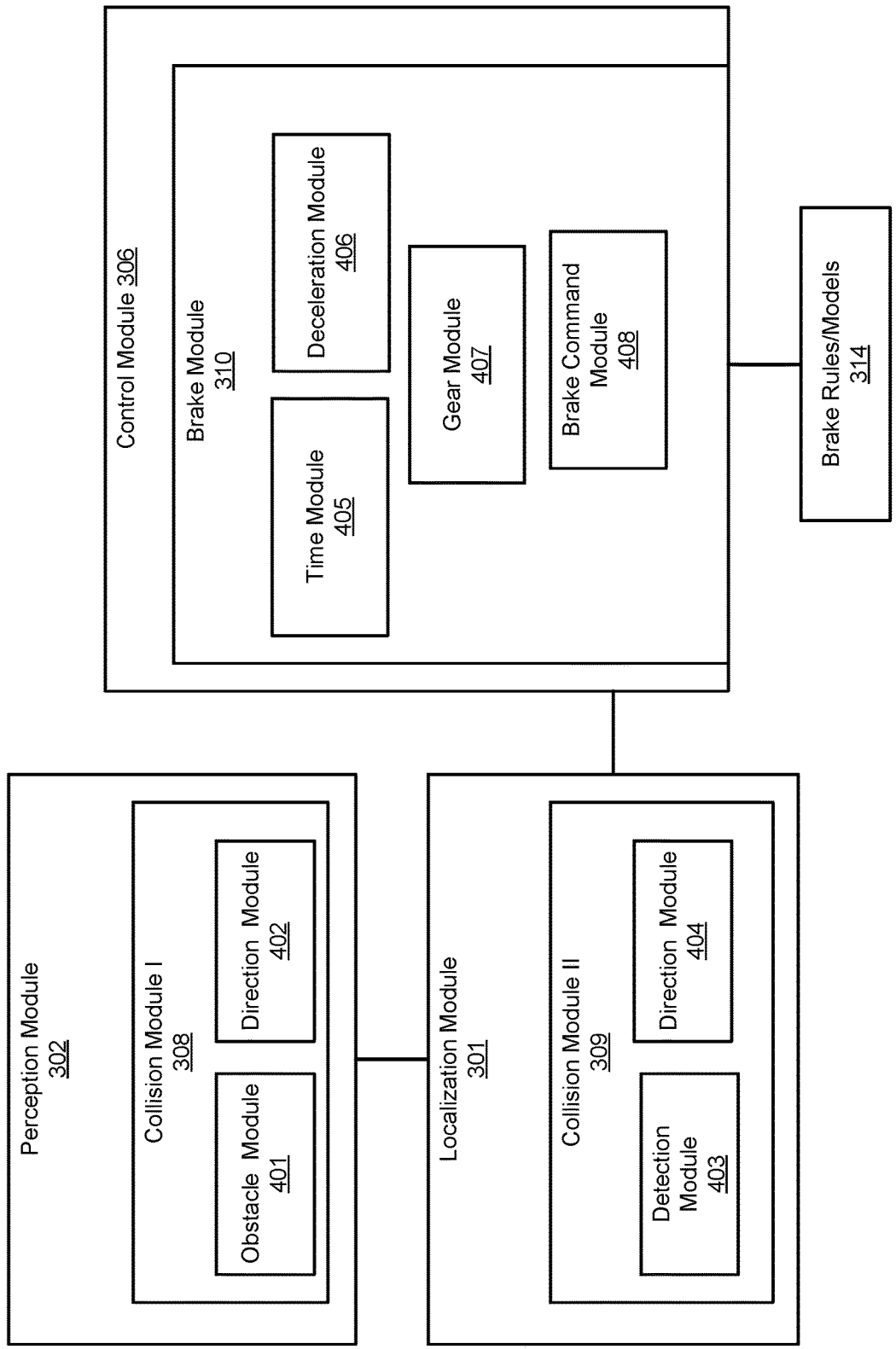
FIG. 4 is a block diagram illustrating an example of a perception module, a localization module and a control module according to one embodiment.

FIG. 4 is a block diagram 400 illustrating an example of a perception module, a localization module and a control module of an ADV according to one embodiment. Referring to FIG. 4, collision module I 308 in perception module 302 includes, but is not limited to, obstacle 401 and direction module 402. Modules 401-402 may be integrated into a single module. Collision module II 309 in localization module 301 includes, but is not limited to, detection module 403 and direction module 404. Modules 403-404 may be integrated into a single module. Brake module includes, but is not limited to, time module 405, deceleration module 406, gear module 407, brake command generator 408 and brake command applicator 409, which work together using brake rules or models 314 to control the ADV to avoid collision and softens an impact of the collision with an obstacle. Note that modules 405-409 may be integrated into fewer number of modules or a single module.

According to one embodiment, a driving environment is identified. The driving environment may be identified as a part of perception process performed by perception module 302 based on sensor data obtained from various sensors mounted on an ADV such as the sensors as shown in FIG.

2. For example, obstacle module may be configured to detect a first obstacle in contact with the ADV. Detection module 403 in localization module 301 may be configured to detect the first obstacle colliding with the ADV. For example, Detection module 403 may use IMU to monitor sudden changes in acceleration (>1G m/s²). Because the ADV cannot generate a larger than 1G m/s² acceleration/deceleration without being in a collision condition. Perception module 302 and localization module 301 may work together to detect a first obstacle colliding with the ADV. Based on a collision angle from the first obstacle, direction module 402 or 404 determine a current moving direction of the ADV. Direction module 402 or 404 may be included in perception module 302 or localization module 301. Obstacle module 401 may be further configured to determine a second obstacle, which is the closest obstacle within a predetermined proximity of the moving direction.

In one embodiment, time module 405 is configured to determine whether a time duration when the ADV is to be in collision with the second obstacle is less than or equal to a predetermined time threshold. Deceleration module is configured to determining a minimum deceleration that is required for the ADV to avoid colliding with the second obstacle within the predetermined proximity of the moving direction. If the time duration when the ADV is to be in collision with the second obstacle is more than the predetermined time threshold, the minimum deceleration is zero. Otherwise, the minimum deceleration is calculated based on a difference between a speed of the ADV and a speed of the second obstacle, and a distance between the ADV and the second obstacle. Gear module 407 is configured to set a gear position of the ADV to a "Neutral" position. Brake command module 408 is configured to generate a brake command based on the minimum deceleration and apply the brake command to the ADV.

Figure 5:
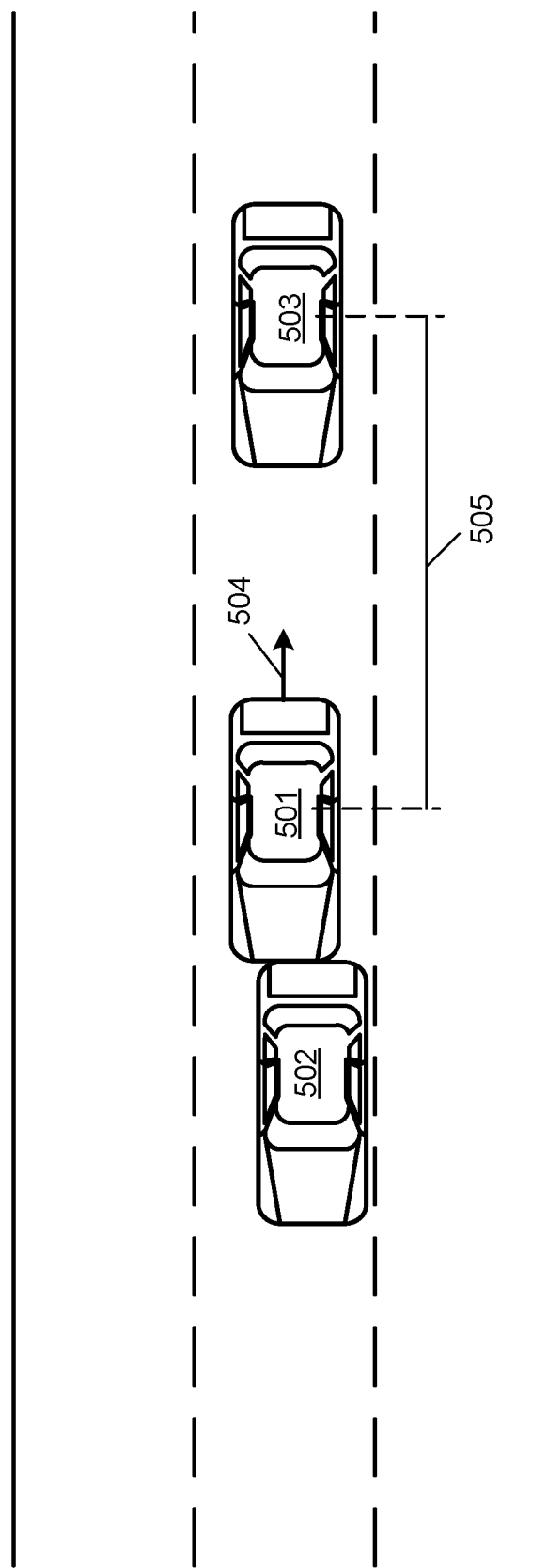
FIG. 5 illustrates a situation of a collision.

FIG. 5 illustrates a situation 500 of a collision of an ADV 501 with a first obstacle 502. During the collision, it is important to reduce damage to both the ADV 501 and the first obstacle 502, and avoid to cost damage to other obstacles (e.g., 503). An obstacle may be a vehicle, motorcycle, bicycle, or pedestrian, etc. Currently, an ADV is configured to apply a brake during a collision, which may not always be a good solution. As illustrated in FIG. 5, when the ADV 501 is being hit from behind by the first obstacle 502, the ADV 501 may not be able to absorb an impact or energy from the collision by applying the brake. There may be a need to develop a post collision damage reduction method.

Disclosed herein is a post collision damage reduction method by manipulating a brake system of the ADV. By this method, the ADV may absorb energy from the collision to soften the impact of the collision with the first obstacle and avoid collisions with other obstacles (e.g., 503). For example, when the ADV 501 is being hit from behind by the first obstacle 502, it may be advantageous to release the brake, such that the ADV 501 may slide accordingly to absorb the energy from the collision.

At first, a collision condition may be determined by the ADV 501. For example, obstacle module 401 may detect that the first obstacle 502 is in contact with the ADV 501. Detection module 403 in localization module 301 may be configured to detect the first obstacle colliding with the ADV. For example, an IMU in localization module 301 of the ADV 501 may monitor sudden changes in an acceleration or deceleration of the ADV 501. Because the ADV 501 is not able to generate an acceleration or deceleration larger than 1G m/s² without being in a collision condition. When the IMU detects an acceleration or deceleration larger than 1G m/s² and/or the first obstacle 502 is in contact with the ADV 501, it may be determined that the first obstacle 502 is colliding with the ADV 501.

A current moving direction 504 of the ADV may be determined. For example, direction module 402 in perception module 302 or direction module 404 in localization module 301 may calculate the current moving direction 504 of the ADV 501 based on a collision angle from the first obstacle 502. The collision angle may refer to an angle between a moving direction of the ADV 501 and a moving direction of the first obstacle 502 at a time of the collision. The current moving direction may be calculated according to the momentum conservation law. A closest obstacle 503 within a predetermined proximity of the moving direction 504 may also be determined. For example, the closest obstacle 503 within the predetermined proximity of the moving direction 504 may be determined by the obstacle module 401. For example, the predetermined proximity may be 0.1, 0.5, 1, 5, 10, 20, 30, 45 degrees or any values therebetween. The distance 505 between the ADV 501 and the second obstacle 503 may also be determined by the obstacle module 401. A gear position of the ADV may be set to a "Neutral" position, for example, by the gear module 407.

A time duration to a second collision to the closest obstacle 503 may be determined. A minimum deceleration to avoid a second collision with the closest obstacle 503 may be determined. If the time duration to the second collision is larger than a predetermined time threshold, for example, 8 seconds, the closest obstacle 503 is not with a proximity of the ADV. Thus, the minimum deceleration may be determined to be zero. A deceleration may not be needed or a minimum deceleration of "zero" is determined. Accordingly, a zero brake command may be generated. The ADV may not need to have a brake. In this situation, it is advantageous to generate a "zero" brake command, such that the ADV 501 may slide accordingly to absorb the energy from the collision and softens the impact of the collision with the first obstacle 502.

If the time duration to the second collision is less than or equal to the predetermined time threshold, for example, 8 seconds, a minimal deceleration required to avoid the second collision may be calculated. For example, the minimum deceleration may be calculated based on a difference between a speed of the ADV 501 and a speed of the second obstacle 503, and the distance 505 between the ADV 501 and the second obstacle 503. The minimum deceleration may be calculated by the following equation:

$$a = v\_difference^2 / (2 * distance),$$

where "a" is a deceleration of the ADV 501, "v_difference" is a difference between a speed of the ADV 501 and a speed of the second obstacle 503, and "distance" is the distance 505 between the ADV 501 and the second obstacle 503.

A deceleration command required to provide the minimum deceleration may be generated. Then, the deceleration command may be applied to the ADV 501 such that the ADV 501 may decelerate to avoid the second collision to the closest obstacle 503.

Figure 6:
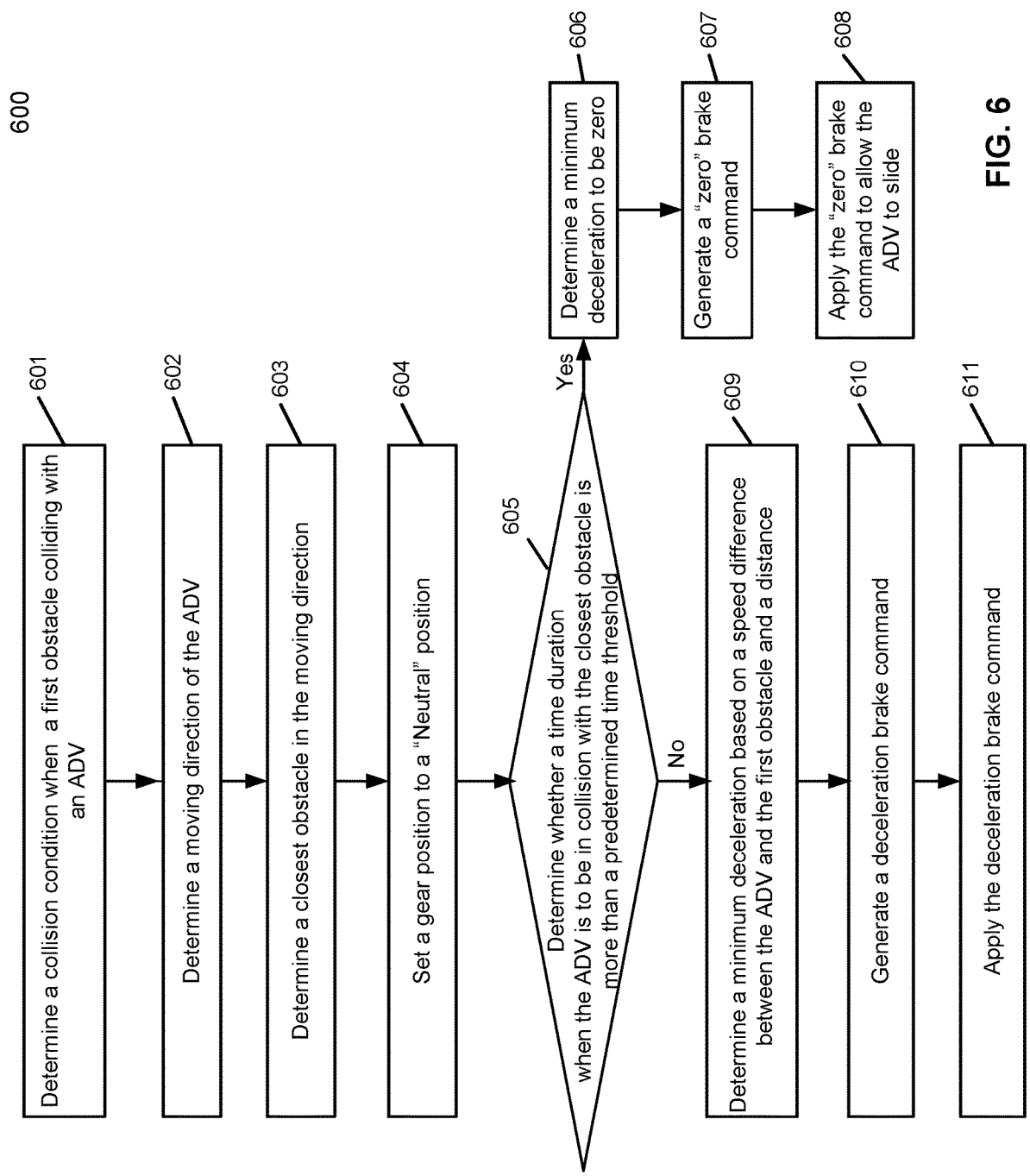
FIG. 6 is a processing flow diagram illustrating an example of reducing post collision damage according to one embodiment.

FIG. 6 is a processing flow diagram 600 illustrating an example of reducing post collision damage according to one embodiment.

At operation 601, a collision condition may be determined by an ADV (e.g., 501). For example, obstacle module 401 may detect that the first obstacle (e.g., 502) is in contact with the ADV. Detection module 403 in localization module 301 may be configured to detect the first obstacle colliding with the ADV. For example, an IMU in localization module 301 of the ADV (e.g., 501) may monitor sudden changes in an acceleration or deceleration of the ADV. When the IMU detects an acceleration or deceleration larger than 1G m/s$^2$ and/or the first obstacle 502 is in contact with the ADV (e.g., 501), it may be determined that the first obstacle (e.g., 502) is colliding with the ADV (e.g., 501).

At operation 602, a current moving direction (e.g., 504) of the ADV (e.g., 501) may be determined. For example, direction module 402 in perception module 302 or direction module 404 in localization module 301 may calculate the current moving direction (e.g., 504) of the ADV based on a collision angle from the first obstacle. The current moving direction may be calculated according to the momentum conservation law.

At operation 603, a closest obstacle (e.g., 503) within a predetermined proximity of the moving direction (e.g., 504) may also be determined. The distance (e.g., 505) between the ADV (e.g., 501) and the second obstacle (e.g., 503) may also be determined by the obstacle module 401. At operation 604, a gear position of the ADV may be set to a "Neutral" position, for example, by the gear module 407. At operation 605, it is determined whether a time duration to a second collision to the closest obstacle (e.g., 503) is more than a predetermined time threshold, for example, 8 seconds.

At operation 606, the minimum deceleration may be determined to be zero in response to determining that the time duration to the second collision is more than the predetermined time threshold. At operation 607, a brake command of "zero" may be generated. At operation 608, the brake command of "zero" may be applied to allow the ADV (e.g., 501) to slide accordingly to absorb the energy from the collision and softens the impact of the collision with the first obstacle.

At operation 609, in response to determining that the time duration to the second collision is less than or equal to the predetermined time threshold, for example, 8 seconds, a minimum deceleration required to avoid the second collision may be calculated. For example, the minimum deceleration may be calculated based on a difference between a speed of the ADV (e.g., 501) and a speed of the second obstacle (e.g., 503), and the distance (e.g., 505) between the ADV and the second obstacle.

At operation 610, a deceleration command required to provide the minimum deceleration may be generated. At operation 611, the deceleration command may be applied to the ADV (e.g., 501) such that the ADV may decelerate to avoid the second collision to the closest obstacle (e.g., 503).

Figure 7:
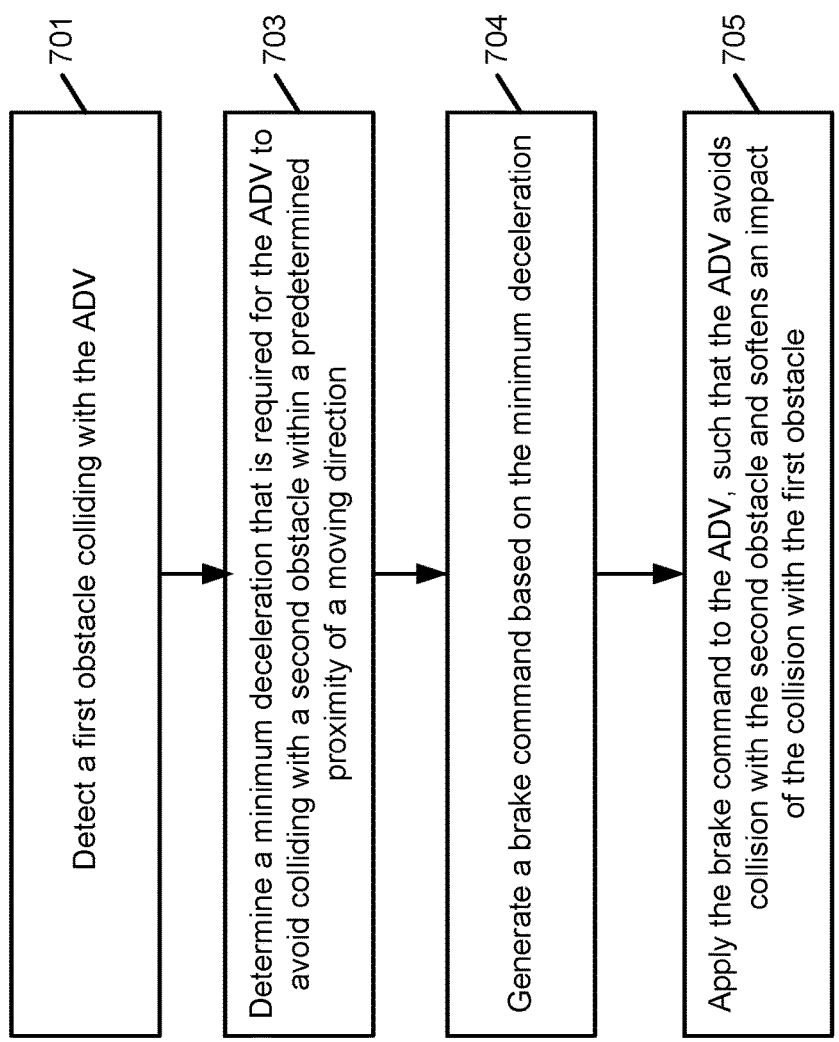
FIG. 7 is a flow diagram illustrating an example of a process for reducing post collision damage according to one embodiment.

FIG. 7 is a flow diagram 700 illustrating an example of a process for reducing post collision according to one embodiment. Process 700 may be performed by processing logic which may include software, hardware, or a combination thereof. For example, process 700 may be performed by localization module 301, perception module 303 and/or control module 306. Referring to FIG. 7, in operation 701, processing logic detects a first obstacle (e.g., vehicles, motorcycles, bicycles) colliding with the ADV. In operation 703, processing logic determines a minimum deceleration that is required for the ADV to avoid colliding with a second obstacle within a predetermined proximity of a moving direction. In operation 704, processing logic generates a brake command based on the minimum deceleration. In operation 705, processing logic applies the brake command to the ADV, such that the ADV avoids collision with the second obstacle and softens an impact of the collision with the first obstacle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    detecting a first obstacle having a collision with the ADV;
    determining a current moving direction of the ADV based on a collision angle from the collision with the first obstacle;
    determining a second obstacle within a predetermined proximity of the current moving direction of the ADV, wherein the predetermined proximity is based at least in part on a predetermined angular range;
    determining a time duration when the ADV is to be in collision with the second obstacle;
    in response to determining that the time duration when the ADV is to be in collision with the second obstacle is more than a predetermined time threshold, determining a minimum deceleration to be zero;
    in response to determining that the time duration when the ADV is to be in collision with the second obstacle is less than or equal to the predetermined time threshold, determining the minimum deceleration based on a difference between a speed of the ADV and a speed of the second obstacle, and a full distance from the ADV to the second obstacle, wherein the minimum deceleration is calculated by a=v_difference^2/(2*distance), and wherein "a" is a deceleration of the ADV, "v_difference" is the difference between the speed of the ADV and the speed of the second obstacle, and "distance" is the full distance from the ADV to the second obstacle;
    generating a brake command based on the minimum deceleration; and
    applying the brake command to the ADV, such that the ADV avoids collision with the second obstacle and softens an impact of the collision with the first obstacle.

2. The method of claim 1, wherein the detecting the first obstacle having the collision with the ADV is based on detecting that an acceleration or deceleration of the ADV is larger than a predetermined acceleration or deceleration threshold.

3. The method of claim 1, further comprising determining a closest obstacle within the predetermined proximity of the moving direction, wherein the second obstacle is the closest obstacle.

4. The method of claim 1, wherein the brake command is a zero percent of a maximum brake command, in response to determining that the time duration when the ADV is to be in collision with the second obstacle is more than the predetermined time threshold.

5. The method of claim 1, further comprising selecting a gear position of the ADV to be a "Neutral" position.

6. The method of claim 1, wherein the detecting the first obstacle having the collision with the ADV comprises detecting that the first obstacle is in contact with the ADV.

7. A non-transitory machine-readable medium having instructions stored therein, which when executed by a processor, cause the processor to perform operations, the operations comprising:
    detecting a first obstacle having a collision with the ADV;
    determining a current moving direction of the ADV based on a collision angle from the collision with the first obstacle;
    determining a second obstacle within a predetermined proximity of the current moving direction of the ADV, wherein the predetermined proximity is based at least in part on a predetermined angular range;
    determining a time duration when the ADV is to be in collision with the second obstacle;
    in response to determining that the time duration when the ADV is to be in collision with the second obstacle is more than a predetermined time threshold, determining a minimum deceleration to be zero;
    in response to determining that the time duration when the ADV is to be in collision with the second obstacle is less than or equal to the predetermined time threshold, determining the minimum deceleration based on a difference between a speed of the ADV and a speed of the second obstacle, and a full distance from the ADV to the second obstacle, wherein the minimum deceleration is calculated by a=v_difference^2/(2*distance), and wherein "a" is a deceleration of the ADV, "v_difference" is the difference between the speed of the ADV and the speed of the second obstacle, and "distance" is the full distance from the ADV to the second obstacle;
    generating a brake command based on the minimum deceleration; and
    applying the brake command to the ADV, such that the ADV avoids collision with the second obstacle and softens an impact of the collision with the first obstacle.

8. The non-transitory machine-readable medium of claim 7, wherein the detecting the first obstacle having the collision with the ADV is based on detecting that an acceleration or deceleration of the ADV is larger than a predetermined acceleration or deceleration threshold.

9. The non-transitory machine-readable medium of claim 7, wherein the operations further comprise determining a closest obstacle within the predetermined proximity of the moving direction, wherein the second obstacle is the closest obstacle.

10. The non-transitory machine-readable medium of claim 7, wherein the brake command is a zero percent of a maximum brake command, in response to determining that the time duration when the ADV is to be in collision with the second obstacle is more than the predetermined time threshold.

11. The non-transitory machine-readable medium of claim 7, wherein the operations further comprise selecting a gear position of the ADV to be a "Neutral" position.

12. The non-transitory machine-readable medium of claim 7, wherein the detecting the first obstacle having the collision with the ADV comprises detecting that the first obstacle is in contact with the ADV.

13. A data processing system, comprising:
    a processor; and
    a memory coupled to the processor to store instructions, which when executed by the processor, cause the processor to perform operations, the operations including
        detecting a first obstacle having a collision with the ADV;

determining a current moving direction of the ADV based on a collision angle from the collision with the first obstacle;

determining a second obstacle within a predetermined proximity of the current moving direction of the ADV, wherein the predetermined proximity is based at least in part on a predetermined angular range;

determining a time duration when the ADV is to be in collision with the second obstacle;

in response to determining that the time duration when the ADV is to be in collision with the second obstacle is more than a predetermined time threshold, determining a minimum deceleration to be zero;

in response to determining that the time duration when the ADV is to be in collision with the second obstacle is less than or equal to the predetermined time threshold, determining the minimum deceleration based on a difference between a speed of the ADV and a speed of the second obstacle, and a full distance from the ADV to the second obstacle, wherein the minimum deceleration is calculated by a=v_difference^2/(2*distance), and wherein "a" is a deceleration of the ADV, "v_difference" is the difference between the speed of the ADV and the speed of the second obstacle, and "distance" is the full distance from the ADV to the second obstacle;

generating a brake command based on the minimum deceleration; and applying the brake command to the ADV, such that the ADV avoids collision with the second obstacle and softens an impact of the collision with the first obstacle.

14. The data processing system of claim 13, wherein the detecting the first obstacle colliding with the ADV is based on detecting that an acceleration or deceleration of the ADV is larger than a predetermined acceleration or deceleration threshold.

15. The data processing system of claim 13, wherein the operations further comprise determining a closest obstacle within the predetermined proximity of the moving direction, wherein the second obstacle is the closest obstacle.

16. The data processing system of claim 13, wherein the brake command is a zero percent of a maximum brake command, in response to determining that the time duration when the ADV is to be in collision with the second obstacle is more than the predetermined time threshold.

17. The data processing system of claim 13, wherein the operations further comprise selecting a gear position of the ADV to be a "Neutral" position.

18. The data processing system of claim 13, wherein the detecting the first obstacle having the collision with the ADV comprises detecting that the first obstacle is in contact with the ADV.

* * * * *